United States Patent
Byun et al.

(10) Patent No.: US 10,306,179 B2
(45) Date of Patent: May 28, 2019

(54) IMAGE PROVIDING APPARATUS, CONTROL METHOD THEREOF, AND IMAGE PROVIDING SYSTEM

(71) Applicant: Samsung Electronics Co., Ltd., Suwon-si, Gyeonggi-do (KR)

(72) Inventors: Jeong-moon Byun, Hwaseong-si (KR); You-young Jung, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/841,570

(22) Filed: Dec. 14, 2017

(65) Prior Publication Data

US 2018/0176505 A1    Jun. 21, 2018

(30) Foreign Application Priority Data

Dec. 15, 2016  (KR) ........................ 10-2016-0171890

(51) Int. Cl.

| | |
|---|---|
| *H04N 7/01* | (2006.01) |
| *H04N 21/436* | (2011.01) |
| *H04N 21/4363* | (2011.01) |
| *H04N 21/45* | (2011.01) |

(52) U.S. Cl.
CPC ......... *H04N 7/0127* (2013.01); *H04N 7/0117* (2013.01); *H04N 7/0125* (2013.01); *H04N 21/43615* (2013.01); *H04N 21/43635* (2013.01); *H04N 21/4516* (2013.01)

(58) Field of Classification Search
CPC .. H04N 7/0127; H04N 7/0117; H04N 7/0125; H04N 21/43615; H04N 21/43635; H04N 21/4516

USPC .......................................................... 348/721
See application file for complete search history.

(56) References Cited

U.S. PATENT DOCUMENTS

| | | | |
|---|---|---|---|
| 8,674,935 B2 | 3/2014 | Rajamani et al. | |
| 8,874,812 B1 | 10/2014 | Hobbs et al. | |
| 8,996,762 B2 | 3/2015 | Wang et al. | |
| 2011/0109792 A1* | 5/2011 | Montag | ................. H04L 65/602 348/390.1 |
| 2012/0054664 A1* | 3/2012 | Dougall | ........... H04N 21/23439 715/772 |

(Continued)

FOREIGN PATENT DOCUMENTS

| | | |
|---|---|---|
| EP | 2 983 354 A1 | 2/2016 |
| JP | 2009-246457 | 10/2009 |

(Continued)

OTHER PUBLICATIONS

Extended European Search Report dated Apr. 10, 2018, in corresponding European Patent Application No. 17204876.1.

*Primary Examiner* — Michael Lee
(74) *Attorney, Agent, or Firm* — Staas & Halsey LLP

(57) ABSTRACT

An image providing apparatus includes: a communication interface configured to perform communication with a display apparatus in a predetermined communication interface method; and a processor configured to acquire specification information of the display apparatus, to encode a first image signal to correspond to the predetermined communication interface method by applying at least one of a frame rate and a resolution corresponding to the acquired specification information, and to control the communication interface to transmit the encoded first image signal to the display apparatus.

19 Claims, 10 Drawing Sheets

(56) References Cited

U.S. PATENT DOCUMENTS

| | | | |
|---|---|---|---|
| 2012/0069894 A1* | 3/2012 | Sakimura | H04N 7/163 375/240.02 |
| 2015/0032912 A1* | 1/2015 | Yamaguchi | G06F 11/3062 710/19 |
| 2015/0304685 A1 | 10/2015 | Vanam et al. | |
| 2015/0326918 A1 | 11/2015 | Oh | |
| 2015/0334388 A1* | 11/2015 | Rabii | H04N 19/103 375/240.26 |

FOREIGN PATENT DOCUMENTS

| | | |
|---|---|---|
| JP | 4579407 | 9/2010 |
| KR | 10-2016-0087226 | 7/2016 |
| WO | WO 2008/030036 A1 | 3/2008 |

\* cited by examiner

IMAGE PROVIDING APPARATUS, CONTROL METHOD THEREOF, AND IMAGE PROVIDING SYSTEM

CROSS-REFERENCE TO RELATED APPLICATIONS

This application claims priority from Korean Patent Application No. 10-2016-0171890, filed on Dec. 15, 2016, in the Korean Intellectual Property Office, the disclosure of which is incorporated herein by reference in its entirety.

BACKGROUND OF THE INVENTION

Field

Apparatuses and methods consistent with exemplary embodiments relate to an image providing apparatus, a control method thereof, and an image providing system, and more particularly, to an image providing apparatus which performs encoding according specification of a display apparatus, a control method thereof, and an image providing system.

Description of the Related Art

With the development of electronic technology, various types of display apparatuses are used. A television (TV), which is one example of the display apparatuses, may display not only broadcast contents transmitted from broadcasting stations, but also images inputted from various source devices.

A related-art source device may encode an image signal independently regardless of the performance of a display apparatus, and may transmit the image signal to the display apparatus. This is because the source device should perform encoding according to a unique frame rate that an image signal has in order to transmit an image of best image quality. Therefore, the display apparatus has to perform frame rate conversion (RFC) processing to adjust a frame rate to the frame rate of a panel of the display apparatus in order to display the image signal inputted from the source device. The same is applied to other image quality processing such as resolution conversion processing, in addition to frame rate conversion processing.

Therefore, as such an image quality processing process should be performed, there is a problem that the time required to display the image signal on a display panel after the image signal is inputted increases.

SUMMARY OF THE INVENTION

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide an image providing apparatus which performs encoding according to specification of a display apparatus, a control method thereof, and an image providing system.

According to an aspect of an exemplary embodiment, there is provided an image providing apparatus, including: a communication interface configured to perform communication with a display apparatus in a predetermined communication interface method; and a processor configured to acquire specification information of the display apparatus, to encode a first image signal to correspond to the predetermined communication interface method by applying at least one of a frame rate and a resolution corresponding to the acquired specification information, and to control the communication interface to transmit the encoded first image signal to the display apparatus.

The processor may be configured to generate the first image signal having a first frame rate, and to encode the first image signal to have a second frame rate different from the first frame rate to correspond to the predetermined communication interface method according to the acquired specification information.

The processor may be configured to generate the first image signal having a first resolution, and to encode the first image signal to have a second resolution different from the first resolution to correspond to the predetermined interface method according to the acquired specification information.

The processor may be configured to determine an operation mode of the display apparatus, and, according to the determined operation mode, to encode the first image signal to correspond to the predetermined communication interface method by applying a unique frame rate and a unique resolution of the first image signal, or to encode the first image signal to correspond to the predetermined communication interface method by applying at least one of the frame rate and the resolution corresponding to the acquired specification information.

The processor may be configured to determine the operation mode of the display apparatus based on a characteristic of the first image signal.

The processor may be configured to control the communication interface to transmit information on the frame rate and the resolution, which are applied when the first image signal is encoded, to the display apparatus with the encoded first image signal.

The processor may be configured to control the communication interface to receive the specification information of the display apparatus from the display apparatus.

The predetermined communication interface method may be an HDMI, a DVI, an MNL, a USB, WiFi, UWB, WiDi, WiHD, a WHDI, Miracast, or Wigig.

The processor may be configured to control the communication interface to transmit the encoded first image signal and an audio signal corresponding to the first image signal to the display apparatus.

According to another aspect of an exemplary embodiment, there is provided an image providing system including: a display apparatus configured to communicate with an image providing apparatus in a predetermined communication interface method; and an image providing apparatus configured to acquire specification information of the display apparatus, to encode a first image signal to correspond to the predetermined communication interface method by applying at least one of a frame rate and a resolution corresponding to the acquired specification information, and to transmit the encoded first image signal to the display apparatus in the predetermined communication interface method, wherein the display apparatus is configured to decode the first image signal which is encoded and received from the image providing apparatus and display the first image signal.

The display apparatus may be configured to, when the encoded first image signal is an image signal which is encoded by applying a frame rate of the display apparatus, decode the encoded first image signal, and then not to perform frame rate conversion processing with respect to the decoded image signal.

The display apparatus may be configured to, when the encoded first image signal is an image signal which is encoded by applying a resolution of the display apparatus, decode the encoded first image signal and then not to perform resolution conversion processing with respect to the decoded image signal.

The display apparatus may be a display system which includes a plurality of sub display apparatuses, and the image providing apparatus may be configured to transmit the encoded first image signal to at least one of the plurality of sub display apparatuses.

The display apparatus may be a digital signage apparatus.

The display apparatus may be configured to transmit the specification information of the display apparatus to the image providing apparatus.

According to another aspect of an exemplary embodiment, there is provided a control method of an image providing apparatus, the method including: acquiring specification information of a display apparatus; encoding a first image signal to correspond to a predetermined communication interface method by applying at least one of a frame rate and a resolution corresponding to the acquired specification information; and transmitting the encoded first image signal to the display apparatus according to the predetermined communication interface method.

The encoding may include encoding the first image signal generated with a first frame rate to have a second frame rate different from the first frame rate to correspond to the predetermined communication interface method according to the acquired specification information.

The encoding may include encoding the first image signal generated with a first resolution to have a second resolution different from the first resolution to correspond to the predetermined communication interface method according to the acquired specification information.

The method may further include transmitting information on the frame rate and the resolution which are applied when the first image signal is encoded to the display apparatus.

The acquiring the specification information of the display apparatus may include receiving the specification information of the display apparatus from the display apparatus.

Additional and/or other aspects and advantages of the invention will be set forth in part in the description which follows and, in part, will be obvious from the description, or may be learned by practice of the invention.

BRIEF DESCRIPTION OF THE DRAWING FIGURES

The above and/or other aspects of the present disclosure will be more apparent by describing certain exemplary embodiments of the present disclosure with reference to the accompanying drawings, in which.

DETAILED DESCRIPTION OF THE EXEMPLARY EMBODIMENTS

Figure 1:
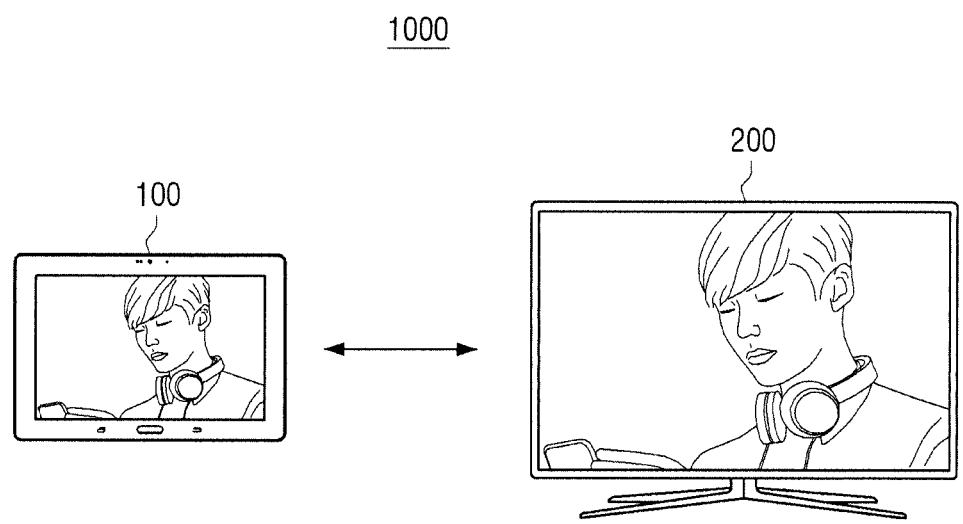
FIGS. 1 and 2 are views to illustrate an image providing system according to various exemplary embodiments.

In the following description, detailed descriptions of well-known functions or configurations will be omitted since they would unnecessarily obscure the subject matters of the present invention. Also, the terms used herein are defined according to the functions of the present invention. Thus, the terms may vary depending on a user's or operator's intension and usage. That is, the terms used herein must be understood based on the descriptions made herein.

The terms such as "first" and "second" used in various exemplary embodiments may be used to explain various elements, and does not limit the corresponding elements. These terms may be used for the purpose of distinguishing one element from another element.

The terms used in various exemplary embodiments of the present disclosure are just for the purpose of describing particular exemplary embodiments and are not intended to limit the present disclosure. The singular forms are intended to include the plural forms as well, unless the context clearly indicates otherwise. The terms "include" or "is configured" indicate the presence of features, numbers, steps, operations, elements, and components described in the specification, or a combination thereof, and do not preclude the presence or addition of one or more other features, numbers, steps, operation, elements, or components, or a combination thereof.

In addition, a "module" or "unit" used in exemplary embodiments performs one or more functions or operations, and may be implemented by using hardware or software or a combination of hardware and software. In addition, a plurality of "modules" or a plurality of "units" may be integrated into one or more modules, except for a "module" or "unit" which needs to be implemented by specific hardware, and may be implemented as one or more processors.

Exemplary embodiments will now be described more fully with reference to the accompanying drawings, so that a person skilled in the art can easily implement embodiments. The exemplary embodiments may, however, be embodied in many different forms and should not be construed as limited to the exemplary embodiments set forth herein. In addition, portions having nothing to do with the description are omitted from the drawings to exactly describe the present disclosure, and similar reference numerals are used for similar parts throughout the description.

FIG. 1 is a view showing a configuration of an image providing system according to an exemplary embodiment.

Referring to FIG. 1, the image providing system 1000 may include an image providing apparatus 100 and a display apparatus 200.

The image providing apparatus 100 and the display apparatus 200 may perform communication with each other in a predetermined communication interface method. Herein, the predetermined communication interface method includes a wire method and a wireless method.

The image providing apparatus 100 may acquire specification information of the display apparatus 200, may encode an image signal to be displayed on the display apparatus 200 based on the acquired specification information to correspond to the predetermined communication interface method, and may transmit the encoded image signal to the display apparatus 200 in the predetermined communication interface method. Herein, encoding the image signal to correspond to the predetermined communication interface method refers to converting the image signal into such a form that the image signal can be transmitted in the predetermined communication interface method.

A detailed operation and a configuration of the image providing apparatus 100 described above will be described below with reference to FIG. 3.

The display apparatus 200 may transmit the specification information of the display apparatus 200 to the image providing apparatus 100 in response to a request from the image providing apparatus 100. In addition, the display apparatus 200 may receive the image signal transmitted from the image providing apparatus 100 and may decode the received image signal. In addition, the display apparatus 200 may display the decoded image signal without performing separate image quality processing, based on a frame rate or a resolution which is applied when the image providing apparatus 100 encodes the image signal, or may perform image quality processing such as adjusting a resolution, adjusting a frame rate, or the like with respect to the decoded image signal, and may display the image signal. A detailed operation and a configuration of the display apparatus 200 described above will be described below with reference to FIG. 5.

Figure 2:
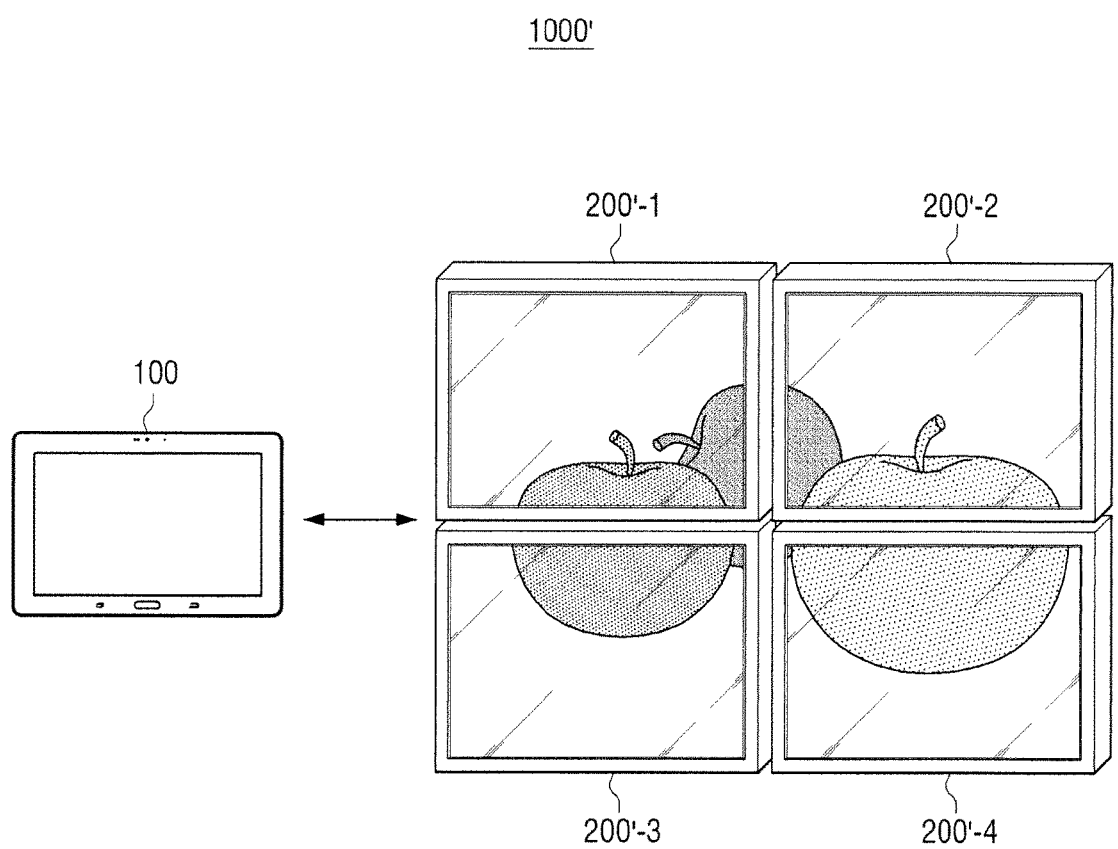

In the image providing system 1000 described above according to an exemplary embodiment, the image providing apparatus 100 may perform image quality processing that should be performed at the display apparatus 200, such as changing a resolution or converting a frame rate, on behalf of the display apparatus 200, such that the image signal can be more rapidly reproduced at the display apparatus 200. In particular, when the present disclosure is applied to mirroring technology for showing an image signal which is being displayed on the image providing apparatus 100 through the display apparatus 200 as it is, there is an advantage that an image signal display delay between the image providing apparatus 100 and the display apparatus 200 can be noticeably reduced. Although FIG. 1 depicts that the image providing system 1000 includes one image providing apparatus 100 and one display apparatus 200, various combinations of at least one image providing apparatus and at least one display apparatus are possible. FIG. 2 illustrates one of the various combinations.

FIG. 2 is a view showing an image providing system 1000' according to another exemplary embodiment.

Referring to FIG. 2, the image providing system 1000' may include an image providing apparatus 100 and a display system including a plurality of display apparatuses 200'-1, 200'-2, 200'-3, 200'-4.

The plurality of display apparatuses 200'-1, 200'-2, 200'-3, 200'-4 may be physically connected with one another, thereby forming one display system.

The image providing apparatus 100 may perform communication with at least one of the plurality of display apparatuses 200'-1, 200'-2, 200'-3, 200'-4 in a predetermined communication interface method.

The image providing apparatus 100 may acquire specification information of at least one of the plurality of display apparatuses 200'-1, 200'-2, 200'-3, 200'-4, may encode an image signal to be displayed on the plurality of display apparatuses 200'-1, 200'-2, 200'-3, 200'-4 based on the acquired specification information to correspond to the predetermined communication interface method, and may transmit the encoded image signal to at least one of the plurality of display apparatuses 200'-1, 200'-2, 200'-3, 200'-4, for example, the first display apparatus 200'-1, in the predetermined communication interface method.

The first display apparatus 200'-1 may transmit the specification information of at least one of the plurality of display apparatuses 200'-1, 200'-2, 200'-3, 200'-4 to the image providing apparatus 100 in response to a request from the image providing apparatus 100. For example, when the plurality of display apparatuses 200'-1, 200'-2, 200'-3, 200'-4 have the same specification, the specification information of one apparatus may be transmitted, and, when the plurality of display apparatuses 200'-1, 200'-2, 200'-3, 200'-4 have different specification, respective pieces of specification information may be transmitted.

In addition, the first display apparatus 200'-1 may receive the image signal from the image providing apparatus 100. In addition, the image signal inputted to the first display apparatus 200'-1 may be transmitted to the other display apparatuses in sequence in a cascade method.

Each of the plurality of display apparatuses 200'-1, 200'-2, 200'-3, 200'-4 may decode the inputted image signal. Alternatively, a certain display apparatus may decode the image signal and may transmit the decoded image signal to the other display apparatuses.

In addition, each of the plurality of display apparatuses 200'-1, 200'-2, 200'-3, 200'-4 may display the decoded image signal without performing separate image quality processing, based on a frame rate or a resolution which is applied when the image providing apparatus 100 encodes the image signal, or may perform image quality processing such as adjusting a resolution, adjusting a frame rate, or the like with respect to the decoded image signal, and may display the image signal. Alternatively, a certain display apparatus may complete the image quality processing and may transmit the result of the image quality processing to the other display apparatuses.

Each of the plurality of display apparatuses 200'-1, 200'-2, 200'-3, 200'-4 may display a part of the inputted image signal based on their respective arrangement positions on the display system 200'. When images displayed on the plurality of display apparatuses 200'-1, 200'-2, 200'-3, 200'-4 are combined in this way, one entire image may be configured as shown in FIG. 2. However, each of the plurality of display apparatuses 200'-1, 200'-2, 200'-3, 200'-4 may display the same image.

Although the image providing apparatus 100 communicates with only one of the plurality of display apparatuses 200'-1, 200'-2, 200'-3, 200'-4 in the above example, the image providing apparatus 100 may communicate with two or more display apparatuses in practice. For example, the image providing apparatus 100 may transmit an image signal encoded in parallel to each of the plurality of display apparatuses 200'-1, 200'-2, 200'-3, 200'-4.

Figure 3:
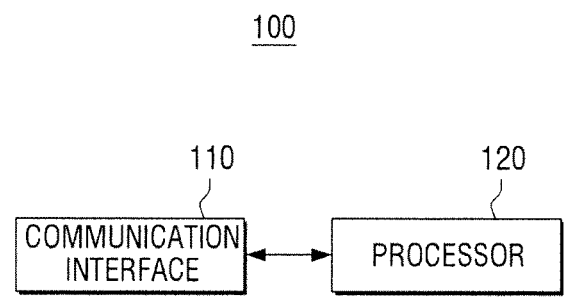
FIGS. 3 and 4 are views to illustrate an image providing apparatus according to various exemplary embodiments.

FIG. 3 is a block diagram to illustrate a configuration of the image providing apparatus according to an exemplary embodiment.

Referring to FIG. 3, the image providing apparatus 100 may include a communication interface 110 and a processor 120. Although FIG. 3 depicts that image providing apparatus 100 is a tablet PC, this should not be considered as limiting. For example, the image providing apparatus 100 may be any apparatus that can transmit an image signal to the display apparatus 200, such as a smart phone, a desktop PC, a game console, or the like.

The communication interface 110 may be configured to communicate with various external devices. In particular, the communication interface 110 may transmit an image signal to the display apparatus 200 in a predetermined communication method.

Herein, the predetermined communication method may be a wire or wireless communication method, such as a high definition multimedia interface (HDMI), a digital visual interface (DVI), a mobile high-definition link (MHL), a universal serial bus (USB), Wireless Fidelity (WiFi), a ultra wideband (UWB), wireless display (WiDi), wireless HD (WiHD), a wireless home digital interface (WHDI), Miracast, wireless gigabit alliance (Wigig), or the like.

In addition, the communication interface 110 may transmit an audio signal to the display apparatus 200 with the image signal. In addition, the communication interface 110 may transmit control data for controlling the display apparatus 200 to the display apparatus 200 in response to a user operation inputted through the image providing apparatus 100.

In addition, the communication interface 110 may receive specification information of the display apparatus 200. Herein, the specification information may include information such as a resolution of the display apparatus 200, a frame rate, or the like. The specification information of the display apparatus 200 may be received from the display apparatus 200 or may be received from other apparatus than the display apparatus 200. In addition, the specification information of the display apparatus 200 may be pre-stored in the image providing apparatus 100.

In addition, the communication interface 110 may receive state information of the display apparatus 200. Herein, the state information may be information on an operation mode (for example, a game mode, a movie mode, or the like) of the display apparatus 200, a power state of the display apparatus, or the like.

The specification information and the state information may be received in the form of one piece of information.

The processor 120 may control respective components in the image providing apparatus 100.

When it is necessary to transmit the image signal to the display apparatus 200, the processor 120 may determine encoding information (or encoding specification) on which the image signal to be transmitted to the display apparatus 200 is encoded based. The encoding information may include at least one of a resolution, a frame rate, and a bit rate.

Specifically, in response to it being determined that the operation mode of the display apparatus 200 is a mode that is required to rapidly display the image signal provided from the image providing apparatus 100, the processor 120 may determine encoding information to correspond to a communication interface method for transmitting the image signal to the display apparatus 200 and the specification of the display apparatus 200.

The mode that is required to rapidly display the image signal provided from the image providing apparatus 100 may include, for example, a mode that allows an image signal (for example, a game image signal or a videotelephony image signal) generated at the image providing apparatus 100 in real time in response to a user's real-time interaction to be provided to and displayed on the display apparatus 200. That is, the mode may refer to a mode that prefers allowing the image signal generated at the image providing apparatus 100 to be displayed on the display apparatus 200 without a delay.

The processor 120 may determine the operation mode of the display apparatus 200 based on the state information received from the display apparatus 200. The state information received from the display apparatus 200 may include information on the operation mode of the display apparatus 200 (for example, a game mode, a videotelephony mode, or the like).

Alternatively, the processor 120 may determine the operation mode of the display apparatus 200 based on a characteristic of the image signal to be transmitted to the display apparatus 200. For example, in response to the image signal to be transmitted to the display apparatus 200 being a game image signal or a videotelephony image signal, the processor 120 may determine the operation mode of the display apparatus 200 to the mode that is required to rapidly display the image signal provided from the image providing apparatus 100.

The processor 120 may encode the image signal according to the encoding information which is determined to correspond to the communication interface method for transmitting the image signal to the display apparatus 200 and the specification of the display apparatus 200.

Specifically, the processor 120 may acquire specification information of the display apparatus 200. In this case, the processor 120 may control the communication interface 110 to receive the specification information of the display apparatus 200 from the display apparatus 200. The specification information may include information on at least one of a resolution and a frame rate of the display apparatus 100.

In addition, the processor 120 may encode the image signal to correspond to the communication interface method for transmitting the image signal to the display apparatus 200 by applying at least one of the frame rate and the resolution of the display apparatus 200.

In this case, the processor 120 may encode the image signal according to a bit rate which is determined based on at least one of the resolution and the frame rate of the display apparatus 200.

According to an exemplary embodiment, the processor 120 may determine whether to apply only one of the resolution or the frame rate of the display apparatus 200 to encode the image signal or whether to apply both the resolution and the frame rate of the display apparatus 200 to encode the image signal, according to the operation mode of the display apparatus 200.

For example, in response to the operation mode of the display apparatus 200 being a mode that assigns a highest priority to rapidly displaying the image signal provided from the image providing apparatus 100, the processor 120 may encode the image signal by applying both the resolution and the frame rate of the display apparatus 200. This case may be, for example, a case in which an image signal having the importance of being displayed without a delay in response to a user's operation, like a game image signal, is provided to the display apparatus 200.

Alternatively, in response to the operation mode of the display apparatus 200 being a mode that assigns the same priority to rapidly displaying the image signal provided from the image providing apparatus 100 and guaranteeing image quality of the image signal, the processor 120 may encode the image signal by applying only one of the resolution or the frame rate of the display apparatus 200. This case may be, for example, a case in which it is important to display the image signal without a delay and also it is necessary to view the person on the other side with good quality, as in the case of videotelephony.

In addition, the processor 120 may control the communication interface 110 to provide the image signal encoded in the above-described method to the display apparatus 200.

According to the above-described embodiment, since the image signal already encoded with image quality meeting the specification of the display apparatus 200 at the image providing apparatus 100 is provided to the display apparatus 200, it is not necessary for the display apparatus 200 to perform frame rage conversion processing or resolution conversion process after decoding the image signal. Therefore, the image signal can be displayed on the display apparatus 200 more rapidly.

On the other hand, in response to the operation mode of the display apparatus 200 not being the mode that is required to rapidly display the image signal provided from the image providing apparatus 100 (for example, a normal mode or a movie mode), the processor 120 may determine encoding information to correspond to the communication interface method for transmitting the image signal to the display apparatus 200 and unique frame rate and resolution of the image signal, and may encode the image signal according to the determined encoding information.

The reason why the encoding information is determined according to the unique resolution and frame rate of the image signal in response to the operation mode of the display apparatus 200 not being the mode that is required to rapidly display the image signal provided from the image providing apparatus 100 is that encoding should be performed based on the unique frame rate and resolution of the image signal to transmit an image signal of best image quality. In addition, when the display apparatus 200 is better at image quality processing performance such as frame rate conversion processing or resolution conversion processing than the image providing apparatus 100, image quality processing should be performed at the display apparatus 200 rather than at the image providing apparatus 100 during the encoding process to acquire better image quality.

In the above-described exemplary embodiments, the processor 120 determines the operation mode of the display apparatus 200 and determines the encoding information. However, according to another exemplary embodiment, the process of determining the operation mode of the display apparatus 200 may be omitted and the processor 120 may perform encoding with respect to all of the image signals to correspond to the specification of the display apparatus 200.

The processor 120 may control the communication interface 110 to transmit information on the frame rate and the resolution, which are applied when the image signal is encoded, to the display apparatus 200 with the encoded image signal.

In addition, the processor 120 may control the communication interface 110 to transmit an audio signal corresponding to the image signal to the display apparatus 200 with the encoded image signal.

In addition, the processor 120 may transmit, to the display apparatus 200, control data for controlling the display apparatus 200 in response to a user command inputted to the image providing apparatus 100.

In the above-described exemplary embodiments, the resolution and the frame rate have been described as factors related to image quality. However, this is merely an example and the present disclosure may be applied to other factors related to image quality.

Figure 4:
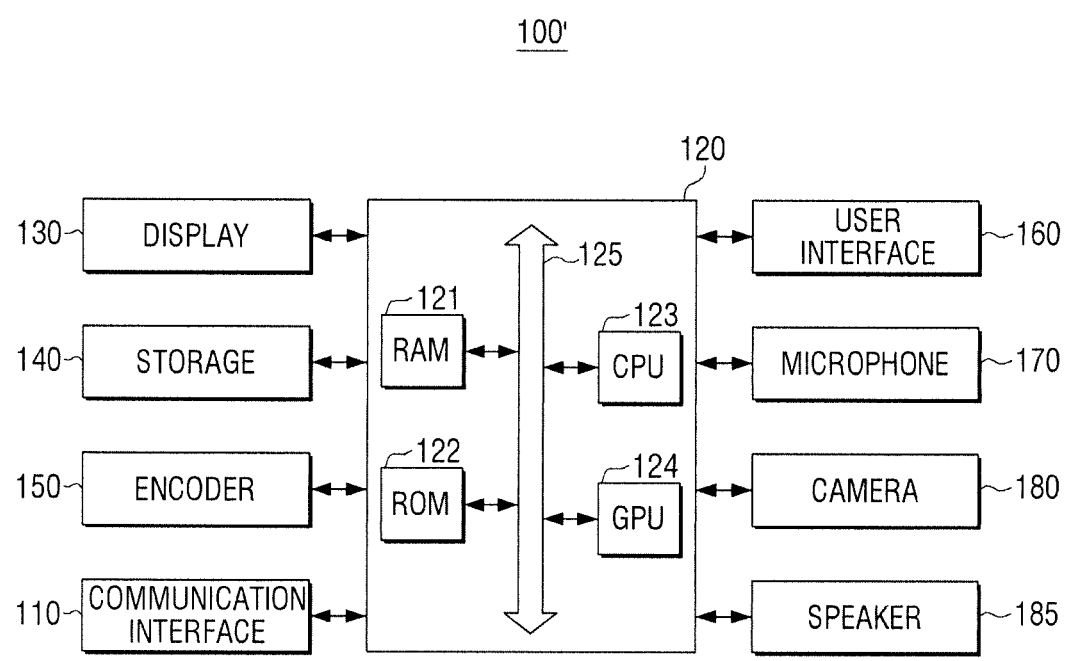

FIG. 4 is a block diagram to illustrate the image providing apparatus 100' according to another exemplary embodiment. In explaining FIG. 4, redundant description of the same elements as those in FIG. 3 will be omitted.

Referring to FIG. 4, the image providing apparatus 100' may include a communication interface 110, a processor 120, a display 130, a storage 140, an encoder 150, a user interface 160, a microphone 170, a camera 180, and a speaker 185.

The communication interface 110 may be configured to communicate with various types of external devices according to various types of communication methods. The communication interface 110 may transmit an encoded image signal to the display apparatus 200 according to a wire or wireless communication method, such as an HDMI, a DVI, an MHL, a USB, WiFi, UWB, WiDi, WiHD, a WHDI, Miracast, Wigig, or the like.

For example, when the image providing apparatus 100' communicates with the display apparatus 200 through the communication interface 110 according to the HDMI, the processor 120 may control the encoder 150 to convert the image signal into such a form that the image signal can be transmitted according to the HDMI by applying at least one of the frame rate and the resolution of the display apparatus 200, and may transmit the encoded image signal to the display apparatus 200 through an HDMI cable.

In another example, when the image providing apparatus 100' communicates with the display apparatus 200 through the communication interface 110 according to WiDi, the processor 120 may control the encoder 150 to convert the image signal into such a form that the image signal can be transmitted according to WiDi by applying at least one of the frame rate and the resolution of the display apparatus 200, and may transmit the encoded image signal to the display apparatus 200 wirelessly through WiDi.

The processor 120 includes a random access memory (RAM) 121, a read only memory (ROM) 122, a central processing unit (CPU) 123, a graphic processing unit (GPU) 124, and a bus 125. The RAM 121, the ROM 122, the CPU 123, and the GPU 124 may be connected with one another through the bus 125.

The CPU 123 may access the storage 140 and performs booting using an operating system (O/S) stored in the storage 140. In addition, the CPU 123 may perform various operations using various programs stored in the storage 140.

The ROM 122 stores a set of commands for booting a system. When a turn-on command is input and power is supplied, the CPU 123 copies the O/S stored in the storage 140 onto the RAM 121 according to the command stored in the ROM 122, executes the O/S and boots the system. When booting is completed, the CPU 123 copies various application programs stored in the storage 140 onto the RAM 121, executes the application programs copied onto the RAM 121, and performs various operations.

The GPU 124 may generate an image signal. For example, the GPU 124 may generate an image signal corresponding to a user control command which is inputted through the user interface 160. The GPU 124 may be implemented by using a system on chip (SoC) coupled to the CPU 123.

The encoder 150 may encode the image signal. For example, the encoder 150 may encode the image signal generated at the GPU 124 or the image signal generated at the camera 180 into such a form that the image signal can be transmitted through a specific communication interface.

The encoder 150 may encode the image signal according to encoding information which is determined at the processor 120.

Specifically, the encoder 150 may encode the image signal based on a unique frame rate and a unique resolution of the image signal according to the encoding information which is determined at the processor 120. Herein, the unique frame rate and the unique resolution of the image signal refer to a frame rate and a resolution that the image signal has when it is initially generated. For example, the image signal generated at the camera 180 may have a frame rate and a resolution according to the performance of the camera 180.

Alternatively, the encoder 150 may encode the image signal based on a frame rate and a resolution meeting the specification of the display apparatus 200 according to the encoding information which is determined at the processor 120. That is, the encoder 150 may encode the image signal based on a frame rate and a resolution which are different from the unique frame rate and the unique resolution of the image signal. For example, when the unique frame rate of the image signal is 60 Hz and a display frame rate of the display apparatus 200 is 120 Hz, the encoder 150 may encode the image signal based on the frame rate of 120 Hz. In another example, when the unique resolution of the image signal is 800×600 and a resolution of the display apparatus 200 is 1280×1024, the encoder 150 may encode the image signal according to the resolution of 1280×1024.

In the above-described embodiment, the encoder 150 is controlled by the processor 120, but the encoder 150 may perform hardware-encoding independently without being controlled by the processor 120 (specifically, the CPU).

The display 130 may be implemented by using various types of displays such as a liquid crystal display (LCD), an organic light emitting diode (OLED) display, a plasma display panel (PDP), or the like.

The processor 120 may display the image signal through the display 130.

The user interface 160 may be configured to receive a user command and may receive various user commands inputted by user's operations. For example, the user interface 160 may include a mechanical button, a touch pad, a motion sensor (for example, a gyro sensor, an acceleration sensor, a gravity sensor, or the like).

The display 130 and the user interface 160 may be combined with each other, such that they are implemented as a touch screen. In addition, in response to a user's voice being received as a user command, the microphone 170 may be implemented as the user interface 160. In addition, in response to a user's motion being captured and received as a command, the camera 180 may be implemented as the user interface 160.

In response to a user operation to control the display apparatus 200 being inputted through the user interface 160, the processor 120 may transmit control data to the display apparatus 200 through the user interface 110.

For example, in a mirroring mode in which the image providing apparatus 100 displays the same image as the display apparatus 200, the processor 120 may display am image on the display 130, may encode an image signal corresponding to the displayed image, and may transmit the encoded image signal to the display apparatus 200 through the communication interface 110.

For example, in response to a reproducing command on a movie file stored in the storage 140 being inputted through the user interface 160, the processor 120 may encode an image signal on the movie file stored in the storage 140, and may control the communication interface 110 to transmit the image signal to the display apparatus 200 in a streaming method. In addition, the processor 120 may reproduce the movie file and display the same on the display 130. In response to an image signal stop command being inputted through the user interface 160 while the same image signal is displayed on the image providing apparatus 100' and the display apparatus 200 through the above-described process, the processor 120 may control the communication interface 110 to transmit control data corresponding to the inputted image signal stop command to the display apparatus 200. Accordingly, the display apparatus 200 may stop displaying the image signal in the same way as the image providing apparatus 100'.

The storage 140 may store various programs and data necessary for the operation of the image providing apparatus 100'.

The storage 140 may be implemented by using a non-volatile memory, a volatile memory, a flash memory, a hard disk drive (HDD), a solid state drive (SSD), or the like. The storage 140 may be accessed by the processor 120, and data may be read/recorded/corrected/deleted/updated by the processor 120. The storage 140 may be implemented by using an external storage medium, for example, a USB or a web server through a network, in addition to a storage medium in the image providing apparatus 100'. The storage 140 may store programs such as an O/S or various applications, and various data such as user setting data, data generated in the process of performing an application, multimedia contents, or the like.

The speaker 185 outputs an audio signal which is generated at the processor 120.

The microphone 170 may be configured to receive a user's voice or other sounds and convert the same into an audio signal.

The camera 180 may be configured to capture a subject and generate an image signal. The camera 180 may be implemented by using a plurality of cameras including a front camera and a rear camera. An image signal generated at the camera 180 may be encoded and transmitted to the display apparatus 200.

Figure 5:
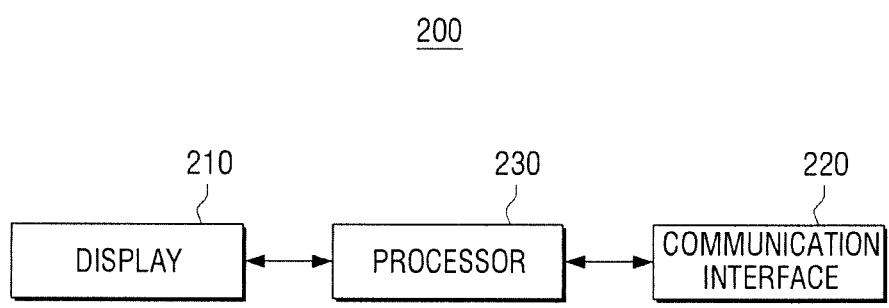
FIGS. 5 to 6 are views to illustrate a display apparatus according to various exemplary embodiments.

FIG. 5 is a block diagram showing a configuration of the display apparatus 200.

Referring to FIG. 5, the display apparatus 200 includes a display 210, a communication interface 220, and a processor 230.

The display apparatus 200 may be implemented by using a TV, a smartphone, a tablet PC, a digital signage, or the like. The digital signage is an outdoor advertisement using a digital information display (DID), and refers to an advertisement board the advertisement content of which may be controlled through a communication network at a control center (or the above-described image providing apparatus 100, 100'). However, the above description is merely an example and is not limited. Any apparatus that has a display function of the display apparatus 200 may be used.

In addition, the display apparatus 200 may be a display system which includes a plurality of sub display apparatuses. For example, the display apparatus 200 may be a large format display (LFD) including a plurality of sub display apparatuses.

The display 210 may be implemented by using various types of displays such as an LCD, an OLED display, a PDP, or the like.

The communication interface 220 may be configured to communicate with various external devices. In particular, the communication interface 110 may receive an encoded image signal from the image providing apparatus 100, 100' through a predetermined communication method.

Herein, the predetermined communication method may be a wire or wireless communication method such as an HDMI, a DVI, an MHL, a USB, WiFi, UWB, WiDi, WiHD, a WHDI, Miracast, Wigig, or the like.

In addition, the communication interface 220 may receive encoding information from the image providing apparatus 100, 100' with the encoded image signal. The encoding information may include information on a frame rate and a resolution which are applied when the image signal is encoded. In addition, the communication interface 220 may receive an audio signal from the image providing apparatus 100, 100' with the image signal. In addition, the communication interface 220 may receive control data for controlling the display apparatus 200 from the image providing apparatus 100, 100'.

In addition, the communication interface 220 may transmit specification information of the display apparatus 200 to the image providing apparatus 100, 100'. Herein, the specification information may include information such as the resolution and the frame rate of the display apparatus 200.

The processor 230 may control the respective components of the display apparatus 200.

The processor 230 may control the communication interface 220 to transmit the specification information of the display apparatus 200 to the image providing apparatus 100, 100'.

In addition, the processor 230 may decode the image signal encoded and received from the image providing apparatus 100, 100'. In addition, the processor 230 may determine what image quality processing pass will be used to process the decoded image signal, based on the encoding information received from the image providing apparatus 100, 100'. The image processing may include resolution conversion and frame rate conversion.

Specifically, in response to it being determined that the encoded image received from the image providing apparatus 100, 100' is an image which is encoded by applying a display frame rate of the display apparatus 200, based on the encoding information, the processor 230 may decode the encoded image and may not perform frame rate conversion processing with respect to the decoded image. On the other hand, in response to it being determined that the encoded image received from the image providing apparatus 100, 100' has no frame rate of the display apparatus 200 applied thereto, based on the encoding information, the processor 230 may decode the encoded image and then may convert the decoded image according to the frame rate of the display apparatus 200.

In addition, in response to it being determined that the encoded image received from the image providing apparatus 100, 100' is an image which is encoded by applying a resolution of the display apparatus 200, based on the encoding information, the processor 230 may decode the encoded image and may not perform resolution conversion processing with respect to the decoded image. On the other hand, in response to it being determined that the encoded image received from the image providing apparatus 100, 100' has no resolution of the display apparatus 200 applied thereto, based on the encoding information, the processor 230 may decode the encoded image and then may convert the decoded image according to the resolution of the display apparatus 200.

In addition, the processor 230 may control the display 210 to display the image signal passing through the image processing pass.

Figure 6:
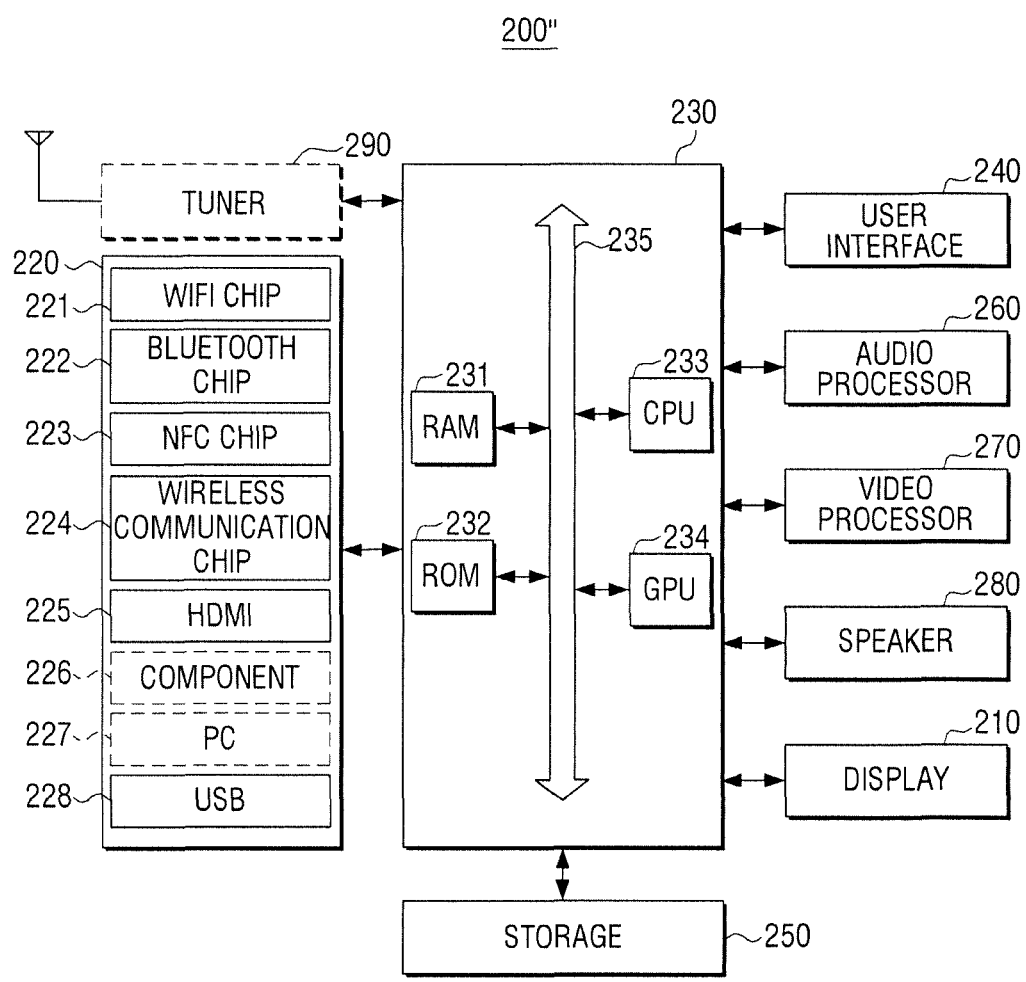

FIG. 6 is a block diagram to illustrate a configuration of the display apparatus according to another exemplary embodiment. In explaining FIG. 6, redundant description of the same elements as those in FIG. 5 will be omitted.

The display apparatus 200' may be implemented by using an analogue TV, a digital TV, a 3D-TV, a smart TV, an LED TV, an OLED TV, a plasma TV, a monitor, a curved TV having a screen of a fixed curvature, a flexible TV having a screen of a fixed curvature, a bended TV having a screen of a fixed curvature, and/or a curvature variable TV which can change a curvature of a current screen according to a received a user input, a digital signage device, or the like, but is not limited thereto.

Referring to FIG. 6, the display apparatus 200' includes a display 210, a communication interface 220, a processor 230, a user interface 240, an audio processor 260, a video processor 270, a speaker 280, and a tuner 290. The display apparatus 200' may include a sensor (for example, an illuminance sensor, a temperature sensor, or the like) (not shown) for detecting an internal state or an external state of the display apparatus 200'.

The processor 230 may control an overall operation of the display apparatus 200' and a signal flow between inner components of the display apparatus 200', and perform a data processing function. The processor 230 may control power supplied to the inner components.

The processor 230 may include a RAM 231, a ROM 232, a CPU 233, a GPU 234, and a bus 235. The RAM 231, the ROM 232, the CPU 233, and the GPU 234 may be connected with one another through the bus 235. The processor 230 may be implemented by using a system on chip (SoC).

The CPU 233 may access a storage 250 and performs booting using an operating system (O/S) stored in the storage 250. In addition, the CPU 233 may perform various operations using various programs, contents, data, or the like stored in the storage 250.

The ROM 232 stores a set of commands for booting a system. When a turn-on command is input and power is supplied, the CPU 233 copies the O/S stored in the storage 250 onto the RAM 231 according to the command stored in the ROM 232, executes the O/S and boots the system. When booting is completed, the CPU 233 copies various application programs stored in the storage 250 onto the RAM 231, executes the application programs copied onto the RAM 231, and performs various operations.

The display 210 may be implemented by using various types of displays such as an LCD, an OLED display, a PDP, or the like.

The communication interface 220 may be configured to communicate with an external device in a wire or wireless communication method such as an HDMI, a DVI, an MHL, a USB, WiFi, UWB, WiDi, WiHD, a WHDI, Miracast, Wigig, or the like.

For example, the communication interface 220 may include at least one of various communication chips, such as a WiFi chip 221, a Bluetooth chip 222, a near field communication (NFC) chip 223, a wireless communication chip 224, or the like. The WiFi chip 221, the Bluetooth chip 222, and the NFC chip 223 may perform communication in a WiFi method, a Bluetooth method, and an NFC method, respectively. The wireless communication chip 224 refers to a chip which performs communication according to various communication standards such as IEEE, Zigbee, $3^{rd}$ generation (3G), $3^{rd}$ generation partnership project (3GPP), long term evolution (LTE), or the like.

In addition, the communication interface 220 may include at least one of an HDMI input port 225, a component input jack 226, a PC input port 227, and a UB input jack 228.

The tuner 290 may tune to and select only a frequency of a channel that the display apparatus 200' wishes to receive from among many radio waves by performing amplification, mixing, and resonance with respect to a broadcast signal received in a wire or wireless manner. The broadcast signal may include a video, an audio, and additional data (for example, electronic program guide (EPG)).

The tuner 290 may receive a video, an audio, and data in a frequency band corresponding to a channel number (for example, cable broadcast channel number 506) corresponding to a user input.

The tuner 290 may receive a broadcast signal from various sources such as a terrestrial broadcast, a cable broadcast, or a satellite broadcast. The tuner 290 may receive a broadcast signal from a source such as an analogue broadcast or a digital broadcast.

The user interface 240 may be configured to receive a user command, and may receive various commands inputted through user's operations. For example, the user interface 240 may include a mechanical button, a touch pad, a motion sensor (for example, a gyro sensor, an acceleration sensor, a gravity sensor, or the like), or the like. In addition, when the display apparatus 200' is implemented by using a TV, the user interface 240 may include a remote control signal receiver. The display 210 and the user interface 240 may be combined with each other to be implemented as a touch screen.

The audio processor 260 is an element for processing an audio signal. The audio processor 260 may perform various processing operations such as decoding, amplification, noise filtering, or the like with respect to the audio signal.

The speaker 280 is an element for outputting various notification sounds or voice messages in addition to various audio signals which are processed at the audio processor 260.

The video processor 270 is an element for processing an image signal. The video processor 270 may perform various processing operations such as encoding, scaling, noise filtering, frame rate conversion, resolution conversion, or the like with respect to the image signal.

In particular, the video processor 270 may decode an image signal which is encoded and received from the image providing apparatus 100, 100', and may determine an image quality processing pass to be applied to the decoded image signal, based on encoding information received from the image providing apparatus 100, 100'. This will be described in detail below with reference to FIGS. 7 and 8.

Figure 7:
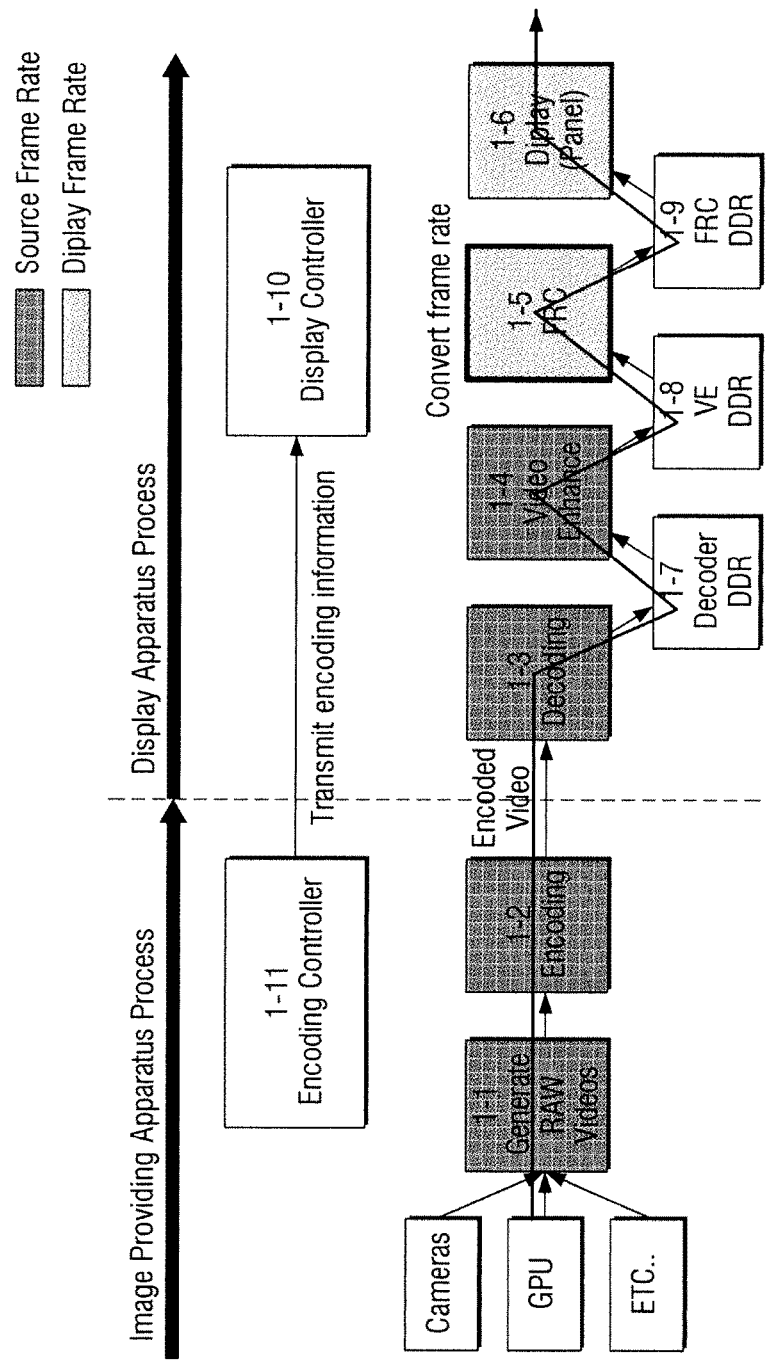
FIGS. 7 and 8 are views to illustrate an image quality processing pass control of a display apparatus according to various exemplary embodiments.

FIG. 7 is a view to illustrate an image quality processing pass of the display apparatus 200' according to an exemplary embodiment.

Specifically, FIG. 7 illustrates a process of transmitting and reproducing an image signal through encoding and decoding at the image providing apparatus 100' and the display apparatus 200'.

Referring to FIG. 7, the image providing apparatus 100' generates an image signal using the camera 180, the GPU 124, the CPU 123, and the like (step 1-1). In response to the image providing apparatus 100' and the display apparatus 200' being connected with each other and it being necessary to transmit the generated image signal to the display apparatus 200', an encoding controller 1-11 (or the processor 120) may determine an operation mode of the display apparatus 200'. The operation mode may be determined based on an attribute of the image signal to be transmitted or state information of the display apparatus received from the display apparatus 200'. The state information may include information on the operation mode (for example, a game mode or the like) of the display apparatus 200'.

In addition, in response to it being determined that the operation mode of the display apparatus 100' is not a mode that is required to rapidly display the image signal provided from the image providing apparatus 100', the encoding controller 1-11 may determine encoding information including a unique frame rate and a unique resolution of the generated image signal. Herein, the determined encoding information may be dynamically changed in every frame.

In addition, the encoding controller 1-11 encodes the image signal according to the determined encoding information (step 1-2). The following description is provided on the assumption that an image signal having a unique frame rate of 60 Hz is encoded to have 60 Hz according to the encoding information in step 1-2. The encoding controller 1-11 transmits the encoded image signal (or encoded video) to the display apparatus 200'. In addition, the encoding controller 1-11 transmits the determined encoding information to the display apparatus 200'.

A display controller 1-10 controls an image quality processing pass based on the encoding information received from the image providing apparatus 100'. Specifically, in step 1-3, the display controller 1-10 decodes the encoded image signal transmitted from the image providing apparatus 100' and stores the decoded image signal in a decoder memory (DDR) (step 1-7). In step 1-4, the display controller 1-10 performs image processing such as noise removal, sharpness enhancement, resolution conversion, or the like. In addition, the display controller 1-10 stores the image quality-processed image signal in a video enhancer memory (VE DDR) (step 1-8). In addition, the display controller 1-10 performs frame rate conversion processing of converting into the frame rate of the panel of the display apparatus 200', that is, 120 Hz (step 1-5). The display controller 1-10 stores the image signal which is frame rate conversion processed in a frame rate converter memory (FRC DDR) (step 1-9). The display controller 1-10 displays the image signal in step 1-6.

Figure 8:
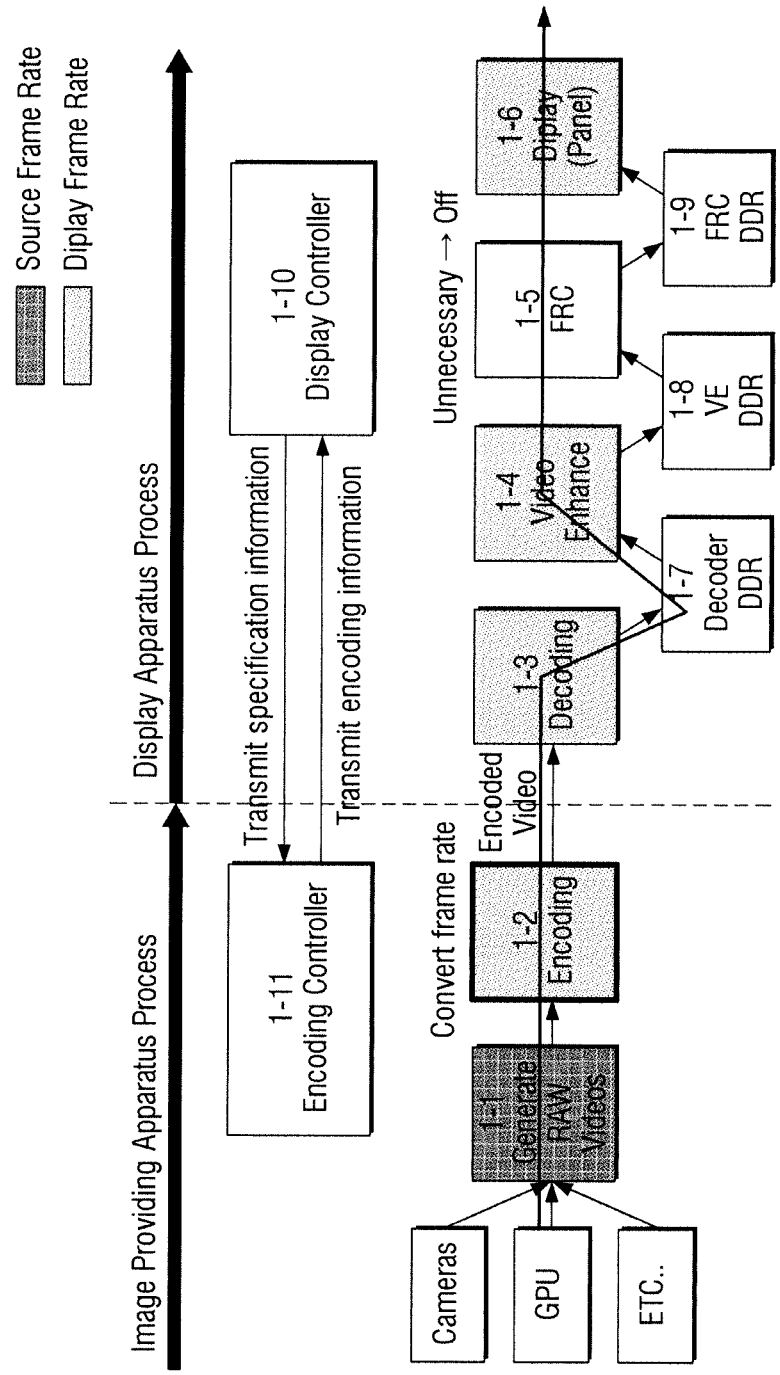

FIG. 8 is a view to illustrate an image quality processing pass of the display apparatus 200' according to another exemplary embodiment. The difference from FIG. 7 is that the image providing apparatus 100' encodes an image signal according to a frame rate of the display apparatus 200'.

Referring to FIG. 8, the image providing apparatus 100' generates an image signal using the camera 180, the GPU 124, the CPU 123, and the like (step 1-1). In response to the image providing apparatus 100' and the display apparatus 200' being connected with each other and it being necessary to transmit the generated image signal to the display apparatus 200', the encoding controller 1-11 (or the processor 120) may determine an operation mode of the display apparatus 200'. The operation mode may be determined based on an attribute of the image signal to be transmitted or state information of the display apparatus received from the display apparatus 200'. The state information may include information on the operation mode (for example, a game mode or the like) of the display apparatus 200'.

In addition, in response to it being determined that the operation mode of the display apparatus 100' is a mode that is required to rapidly display the image signal provided from the image providing apparatus 100', the encoding controller 1-11 may request specification information from the display apparatus 200' and may receive the specification information from the display apparatus 200'. The specification information of the display apparatus 200' may include information on at least one of a display frame rate and a resolution of the display apparatus 200'.

In addition, the encoding controller 1-11 of the image providing apparatus 100' may analyze the specification of the display apparatus 200', hardware specification of the image providing apparatus 100', a network condition, or the like, and may determine encoding information including at least one of a frame rate, an encoding resolution, and a bit rate at which an encoder (or the encoder 150) will operate. Herein, the determined encoding information may be dynamically changed in every frame. For example, the encoding information may be determined based on an object attribute (a person object, a background object, or the like) in a frame or a bit rate which varies according to a network condition.

In addition, the encoding controller 1-11 encodes the image signal according to the determined encoding information (step 1-2). The following description is provided on the assumption that, in step 1-2, an image signal having a unique frame rate of 60 Hz is encoded to have 120 Hz which is a frame rate of a panel of the display apparatus 200' according to the encoding information determined based on the specification information of the display apparatus 100'.

In addition, the encoding controller 1-11 transmits the encoded image signal (or encoded video) to the display apparatus 200'. In addition, the encoding controller 1-11 transmits the determined encoding information to the display apparatus 200'.

The display controller 1-10 controls an image quality processing pass based on the encoding information received from the image providing apparatus 100'. Specifically, in step 1-3, the display controller 1-10 decodes the encoded image signal transmitted from the image providing apparatus 100' and stores the decoded image signal in the decoder memory (DDR) (step 1-7). In step 1-4, the display controller 1-10 performs image processing such as noise removal, sharpness enhancement, resolution conversion, or the like. In addition, the display controller 1-10 may not perform frame rate conversion processing (step 1-5) (FRC Bypass) since the image signal has been already encoded to have 120 Hz according to the frame rate of the display apparatus 200 at the image providing apparatus 100'. The display controller 1-10 displays the image signal in step 1-6.

According to related-art technology, an image providing apparatus performs encoding according to a unique frame rate of an image signal regardless of an operation mode of a display apparatus. Therefore, the display apparatus should perform frame rate conversion processing according to a frame rate of a panel. Therefore, even if it is necessary to rapidly display an image, the display apparatus should go through all of the steps 1-8 and 1-9, and thus, there is a delay in displaying the image. However, according to the present disclosure as described above through FIGS. 7 and 8, when the operation mode of the display apparatus indicates that it is necessary to rapidly display an image (the case of FIG. 8), the display apparatus is not required to go through steps 1-8 and 1-9 since encoding is performed according to a frame rate suitable to a reproducing frequency of the panel of the display apparatus at the image providing apparatus. Therefore, there is an advantage that an image can be more rapidly displayed.

Figure 9:
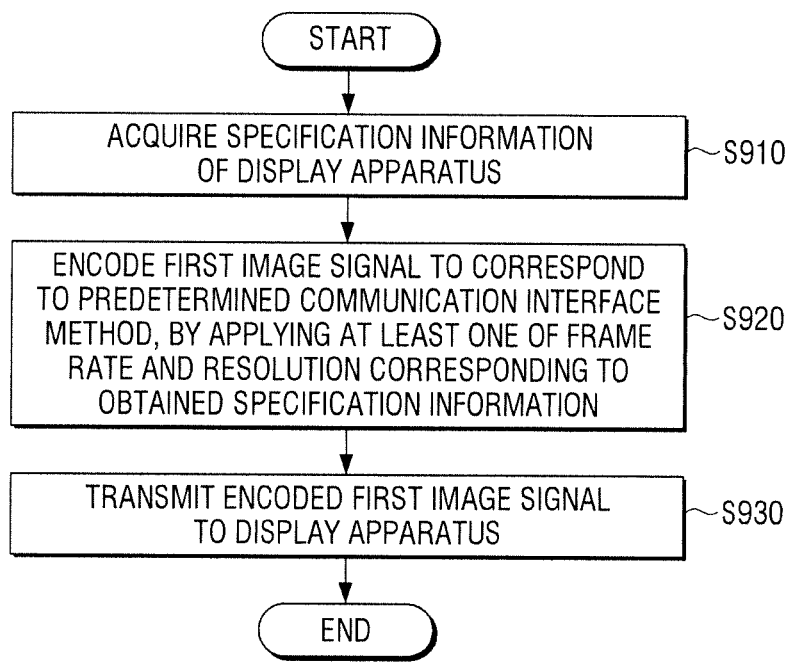
FIG. 9 is a view to illustrate a control method of an image providing apparatus according to an exemplary embodiment.

FIG. 9 is a flowchart to illustrate a control method of an image providing apparatus according to an exemplary embodiment. The flowchart illustrated in FIG. 9 may include operations which are processed at the image providing apparatus 100, 100' as described above with reference to FIGS. 1 to 8. Accordingly, contents which are omitted in the following description but have been described with reference to FIGS. 1 to 8 may be applied to the flowchart illustrated in FIG. 9.

Referring to FIG. 9, the image providing apparatus acquires specification information of the display apparatus (S910).

In this case, the specification information of the display apparatus may be received from the display apparatus.

In addition, the image providing apparatus may encode a first image signal to correspond to a predetermined communication interface by applying at least one of a frame rate and a resolution corresponding to the acquired specification information (S920).

In addition, the image providing apparatus may transmit the encoded first image signal to the display apparatus according to the predetermined communication interface (S930).

In addition, information on the frame rate and the resolution applied when the first image signal is encoded may be transmitted to the display apparatus.

In step S920, the first image signal having a first frame rate may be encoded to have a second frame rate different from the first frame rate to correspond to the predetermined communication interface method, according to the acquired specification information.

In addition, in step S920, the first image signal having a first resolution may be encoded to have a second resolution different from the first resolution to correspond to the predetermined communication interface method, according to the acquired specification information.

Figure 10:
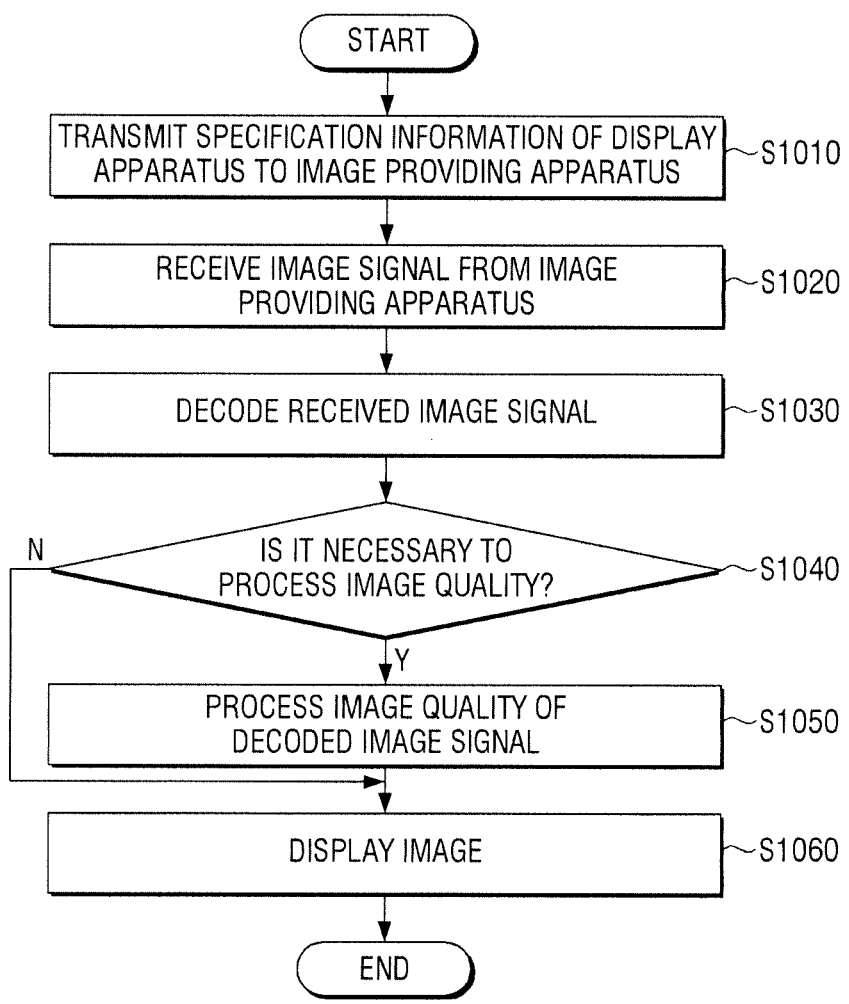
FIG. 10 is a view to illustrate a control method of a display apparatus according to an exemplary embodiment.

FIG. 10 is a flowchart to illustrate a control method of a display apparatus according to an exemplary embodiment. The flowchart illustrated in FIG. 10 may include operations which are processed at the display apparatus 200, 200' as described above with reference to FIGS. 1 to 8. Accordingly, contents which are omitted in the following description but have been described with reference to FIGS. 1 to 8 may be applied to the flowchart illustrated in FIG. 10.

Referring to FIG. 10, the display apparatus may transmit specification information of the display apparatus to the image providing apparatus (S1010). The specification information of the display apparatus may include a frame rate of a display panel or an operation mode which is set by a user.

In addition, the display apparatus may receive an image signal from the image providing apparatus (S1020). In addition, the display apparatus may decode the received image signal (S1030).

In addition, the display apparatus may determine whether to perform image quality processing with respect to the decoded image signal (1040). According to an exemplary embodiment, the display apparatus may receive encoding information from the image providing apparatus and may determine whether to perform image quality processing according to the encoding information. Herein, the encoding information may include information on a frame rate, a resolution, and a bit rate which is applied when the image signal transmitted to the display apparatus is encoded at the image providing apparatus.

In response to it being necessary to perform image quality processing (S1040, Y), the display apparatus may perform image quality processing with respect to the decoded image signal (S1050). Herein, the image quality processing may include frame rate conversion processing and resolution conversion processing.

Specifically, in response to it being determined that a frame rate of the display apparatus is applied to the encoded image signal received from the image providing apparatus and a resolution of the display apparatus is not applied, based on the received encoding information, the display apparatus may not perform frame rate conversion processing with respect to the decoded image signal and may perform resolution conversion processing.

In another case, in response to it being determined that the resolution of the display apparatus is applied to the encoded image signal received from the image providing apparatus and the frame rate of the display apparatus is not applied, based on the received encoding information, the display apparatus may perform frame rate conversion processing with respect to the decoded image signal and may not perform resolution conversion processing.

In still another case, in response to it being determined that the resolution of the display apparatus and the frame rate of the display apparatus are not applied to the encoded image signal received from the image providing apparatus, based on the received encoding information, the display apparatus may perform frame rate conversion processing and resolution conversion processing with respect to the decoded image signal.

In yet another case, in response to it being determined that the resolution of the display apparatus and the frame rate of the display apparatus are applied to the encoded image signal received from the image providing apparatus, based on the received encoding information, that is, that it is not necessary to perform image quality processing (S1040, N), the display apparatus may not perform frame rate conversion processing and resolution conversion processing with respect to the decoded image signal.

After going through the above-described processes, the display apparatus may display the image signal (S1060).

According to exemplary embodiments described above, the image providing apparatus may change encoding specification according to an operation mode of the display apparatus, and accordingly, the display apparatus may change an image quality processing method. Accordingly, in an operation mode in which a delay in displaying an image (or a frame delay) should be minimized, the display apparatus does not have to perform frame rate conversion processing or resolution conversion processing and thus the delay in displaying the image can be reduced.

Various exemplary embodiments described above may be implemented in a recording medium that can be read by a computer or a similar device using software, hardware, or a combination thereof. According to hardware implementation, embodiments described in the present disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and an electric unit for performing other functions. According to software implementation, embodiments such as procedures and functions described in the detailed description may be implemented by using separate software modules. Each of the software modules may perform one or more functions and operations described in the detailed description.

The control method of the display apparatus according to the above-described various exemplary embodiments may be stored in a non-transitory readable medium. The non-transitory readable medium may be mounted and used in various devices.

The non-transitory readable medium refers to a medium that stores data semi-permanently rather than storing data for a very short time, such as a register, a cache, and a memory, and is readable by an apparatus. Specifically, the non-transitory readable medium may be a compact disc (CD), a digital versatile disk (DVD), a hard disk, a Blu-ray disk, a universal serial bus (USB), a memory card, and a read only memory (ROM).

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. An image providing apparatus comprising:
a communication interface configured to perform communication with a display apparatus with a communication interface method; and
a processor configured to
encode a first image signal based on the communication interface method, and
control the communication interface to transmit the encoded first image signal to the display apparatus with the communication interface method,
wherein the processor is further configured to
obtain specification information of the display apparatus including at least one of a resolution or a frame rate,
determine an operation mode of the display apparatus based on at least one of a characteristic of the first image signal or state information of the display apparatus received from the display apparatus, and
based on the operation mode, determine whether to encode the first image signal by applying the obtained specification information of the display apparatus or not.

2. The image providing apparatus of claim 1, wherein the processor is configured to
prior to encoding the first image signal, generate the first image signal having a first frame rate, and
encode the first image signal so that the encoded first image signal has a second frame rate different from the first frame rate, the second frame rate corresponding to the obtained specification information.

3. The image providing apparatus of claim 1, wherein the processor is configured to
prior to encoding the first image signal, generate the first image signal having a first resolution, and
encode the first image signal so that the encoded first image signal has a second resolution different from the first resolution, the second resolution corresponding to the obtained specification information.

4. The image providing apparatus of claim 1, wherein the processor is configured to control the communication interface to transmit information on one or both of the frame rate and the resolution, which are applied to the first image signal when the first image signal is encoded, to the display apparatus with the encoded first image signal.

5. The image providing apparatus of claim 1, wherein the processor is configured to obtain the specification information of the display apparatus from the display apparatus via the communication interface.

6. The image providing apparatus of claim 1, wherein the communication interface method is a high definition multimedia interface (HDMI), a digital visual interface (DVI), a mobile high-definition link (MHL), a universal serial bus (USB), Wireless Fidelity (WiFi), ultra wideband (UWB), wireless display (WiDi), wireless HD (WiHD), a wireless home digital interface (WHDI), Miracast, or wireless gigabit alliance (Wigig).

7. The image providing apparatus of claim 1, wherein the processor is configured to control the communication interface to transmit the encoded first image signal and an audio signal corresponding to the first image signal to the display apparatus.

8. An image providing system comprising:
a display apparatus configured to communicate with an image providing apparatus with a communication interface method; and
an image providing apparatus configured to
encode a first image signal, based on the communication interface method,
transmit the encoded first image signal to the display apparatus with the communication interface method,
wherein the display apparatus is configured to decode the encoded first image signal received from the image providing apparatus and display the decoded first image signal,
wherein the image providing apparatus is further configured to:
obtain specification information of the display apparatus including at least one of a resolution or a frame rate,
determine an operation mode of the display apparatus based on at least one of a characteristic of the first image signal or state information of the display apparatus received from the display apparatus, and
based on the operation mode, determine whether to encode the first image signal by applying the obtained specification information of the display apparatus or not.

9. The image providing system of claim 8, wherein the display apparatus is configured to
when the encoded first image signal is an image signal which is encoded by applying a frame rate of the display apparatus, decode the encoded first image signal, and
display the decoded first image signal without performing frame rate conversion processing on the decoded image signal.

10. The image providing system of claim 8, wherein the display apparatus is configured to
when the encoded first image signal is an image signal which is encoded by applying a resolution of the display apparatus, decode the encoded first image signal, and
display the decoded first image signal without performing resolution conversion processing on the decoded image signal.

11. The image providing system of claim 8, wherein the display apparatus is a display system which comprises a plurality of sub display apparatuses, and
wherein the image providing apparatus is configured to transmit the encoded first image signal to at least one of the plurality of sub display apparatuses.

12. The image providing system of claim 8, wherein the display apparatus is a digital signage apparatus.

13. The image providing system of claim 8, wherein the display apparatus is configured to transmit the specification information of the display apparatus to the image providing apparatus.

14. A control method of an image providing apparatus, the method comprising:
obtaining specification information of a display apparatus including at least one of a resolution or a frame rate:
encoding a first image signal based on a communication interface method used for communication between the image providing apparatus and the display apparatus, and
transmitting the encoded first image signal to the display apparatus with the predetermined communication interface method,
wherein the encoding comprises
determining an operation mode of the display apparatus based on at least one of a characteristic of the first image signal or state information of the display apparatus received from the display apparatus, and
based on the operation mode, determining whether to encode the first image signal by applying the obtained specification information of the display apparatus or not.

15. The method of claim 14, further comprising:
prior to encoding the first image signal, generating the first image signal with a first frame rate; and
encoding the generated first image signal to have a second frame rate different from the first frame rate, the second frame rate corresponding to the obtained specification information.

16. The method of claim 14, further comprising:
prior to encoding the first image signal, generating the first image signal with a first resolution; and
encoding the generated first image signal to have a second resolution different from the first resolution, the second resolution corresponding to the obtained specification information.

17. The method of claim 14, further comprising transmitting information on one or both the frame rate and the resolution, which are applied to the first image signal when the first image signal is encoded, to the display apparatus.

18. The method of claim 14, wherein the obtaining the specification information of the display apparatus comprises receiving the specification information of the display apparatus from the display apparatus.

19. The image providing apparatus of claim 1, wherein the processor is configured to:
according to the operation mode of the display apparatus , encode the first image signal by either:
applying a frame rate and a resolution inherent to the first image signal, or
applying one or both of a frame rate and a resolution corresponding to the obtained specification information of the display apparatus.

* * * * *

UNITED STATES PATENT AND TRADEMARK OFFICE
CERTIFICATE OF CORRECTION

PATENT NO. : 10,306,179 B2  
APPLICATION NO. : 15/841570  
DATED : May 28, 2019  
INVENTOR(S) : Jeong-moon Byun et al.

Page 1 of 1

It is certified that error appears in the above-identified patent and that said Letters Patent is hereby corrected as shown below:

In the Claims

Column 22, Line 4:
In Claim 14, delete "rate:" and insert -- rate; --, therefor.

Signed and Sealed this
Eighteenth Day of February, 2020

Andrei Iancu
*Director of the United States Patent and Trademark Office*